G. D. HARLOW.
TROLLEY.
APPLICATION FILED MAY 22, 1916.
1,228,206.
Patented May 29, 1917.
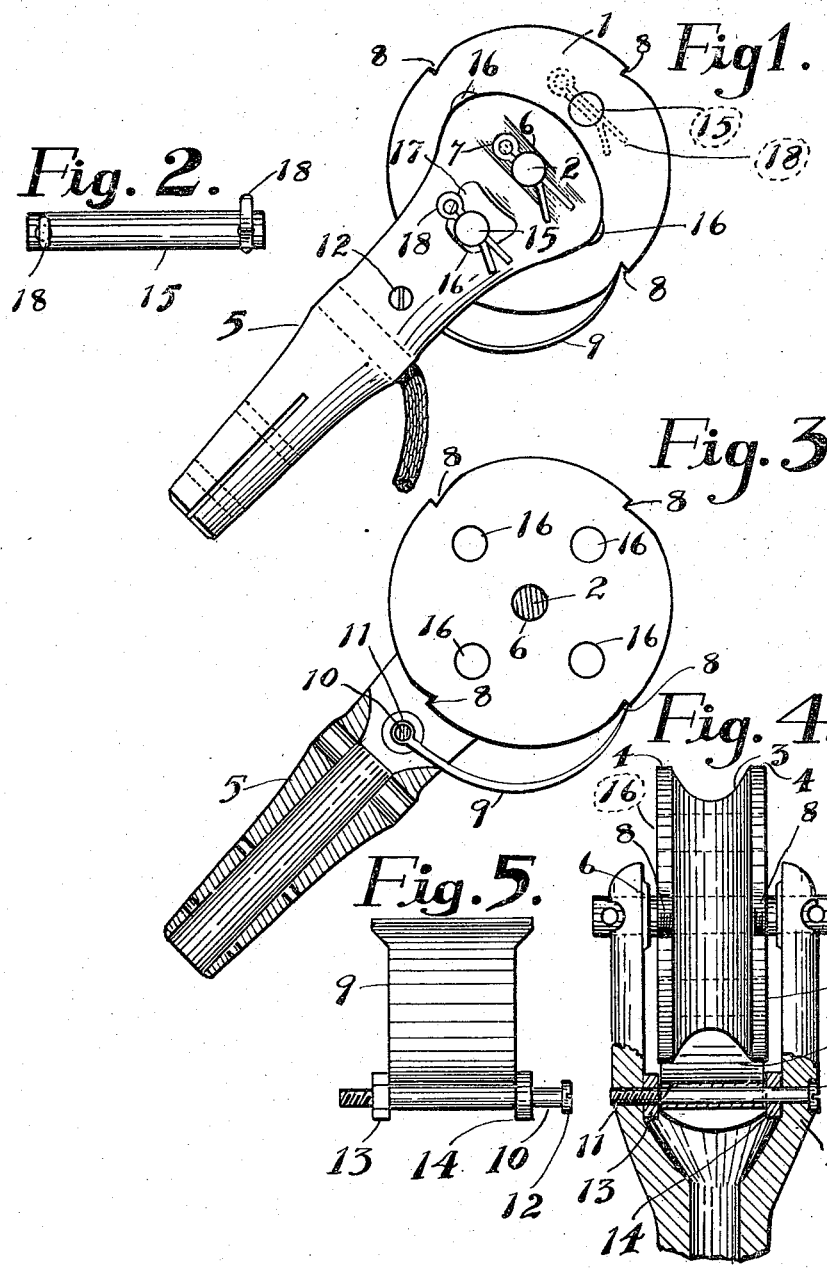
INVENTOR:
George D. Harlow,
BY
Hugh N. Wagner,
ATTORNEY.

UNITED STATES PATENT OFFICE.

GEORGE D. HARLOW, OF ST. LOUIS, MISSOURI.

TROLLEY.

1,228,206.　　　　　　Specification of Letters Patent.　　　Patented May 29, 1917.

Application filed May 22, 1916. Serial No. 99,007.

*To all whom it may concern:*

Be it known that I, GEORGE D. HARLOW, a citizen of the United States, residing at the city of St. Louis, in the State of Missouri, have invented certain new and useful Improvements in Trolleys, of which the following is a specification.

This invention relates to trolley wheels for forming the trolley-wire contact of an electric railway car.

It has for its object to provide a trolley wheel normally adapted as a sliding non-rotating contact when the car is moving in one direction and that will operate as a rotary contact when the car is backed up or moved in the reverse direction.

Another object is to provide a trolley wheel having spring-pressed means adapted for yieldingly holding said wheel against rotation to constitute said wheel a non-rotating contact in sliding engagement with the trolley-wire or other conductor when the car is operated to move in one direction, the moving of the car in the reverse direction being adapted to release said spring-pressed means from holding relation with said wheel and to cause said wheel to rotate to constitute same a rotating contact in movable engagement with said trolley-wire.

Another object is to provide a trolley wheel having spring-pressed means adapted yieldingly to hold said wheel against rotation in one direction and having a removable stop adapted for locking said wheel against rotation in the opposite direction, said removable stop being adapted, also, to lock said wheel against rotation in the first-named direction in case said spring-pressed means is inoperative for any reason.

An advantage of the present invention is that the trolley wheel embodied therein may be conveniently associated with a trolley-head of ordinary construction usually provided with the rotating trolley wheel of ordinary construction.

Another advantage is that the trolley wheel of this invention is adapted for forming a substantially perfect contact with the trolley wire under all operating conditions and is adapted constantly to close or complete the circuit at said contact.

Another advantage is that the removable auxiliary locking member is adapted for locking the wheel against rotation in either direction independently of the spring-pressed holding means.

Another advantage is that the device of the present invention is simple in construction, consists of few parts, and is adapted for having broken or worn parts repaired or substituted by new parts without removing the trolley pole associated therewith from the car.

Other objects and advantages of the present invention are hereinafter described and, moreover, this invention consists in the construction, arrangement, and combination of parts set forth in this specification and pointed out in the claims.

In the accompanying drawings forming part of this specification wherein like numbers of reference denote like parts wherever they occur, Figure 1 is a side view in plan of the device of this invention, showing the trolley wheel mounted on a trolley-head of ordinary construction and showing, also, the removable locking member in two locking positions in place, one of said positions being shown in full lines and the other position being shown in dotted lines;

Fig. 2 is a detailed plan view of the removable locking member apart from the trolley wheel;

Fig. 3 is a sectional view on a line longitudinally of the trolley-head of Fig. 1, the removable locking member having been removed from the trolley wheel;

Fig. 4 is a front view of Fig. 1, partly in plan and partly in section longitudinally of the trolley-head, the lower portion of the trolley-head being broken away and the removable locking member having been removed; and Fig. 5 is a detailed view of the spring-pressed means and its attachments removed from association with the trolley wheel and head.

Wheel 1 may be made of any suitable material, such, for instance, as case hardened steel, and may be rigidly mounted on axle or shaft 2, said shaft having its ends protruding laterally from opposite sides of said wheel. An annular groove 3 may be formed in the peripheral face of wheel 1, said groove being adapted to receive therein the trolley-wire or other conductor (not shown) in a well-known manner, the depth of said groove being sufficient so that said wheel will readily be prevented from slipping laterally off from said trolley-wire by opposite annular ridges 4 peripherally borne by said wheel adjacent the upper edges of said groove.

Wheel 1 may be rotatably mounted in the forked end of trolley-pole-head 5 by means of mounting the opposite ends of axle or shaft 2 in bearings 6 borne by the opposite forks of said trolley-pole-head, said shaft being rotatable in said bearings, and said ends being adapted to protrude outwardly through said forks and being perforated, as best seen in Fig. 4, the end-perforations being adapted to receive therethrough cotter pins 7, which are adapted to prevent said shaft from sliding out of its bearings in said forks.

A plurality of pairs of opposite notches 8 may be borne by annular peripheral ridges 4, said notches having an abrupt shoulder at one end and sloping gradually away from the lower end of said shoulder to the peripheral edge of said ridges, as shown in the drawings, so that the adjacent end of member 9 may slide into said notches and engage against said shoulder, as hereinafter more particularly described, member 9 having its other end borne by bolt 10 or the like, said bolt being mounted adjacent the base of the forked end of trolley-pole-head 5 and between the forks of said forked end, there being a pair of opposite perforations 11 in said forks wherein opposite ends of said bolt are supported, one end of said bolt having a head 12 and the other end being screw-threaded to engage the correspondingly screw-threaded adjacent one of perforations 11. A nut 13 or the like may be borne by the screw-threaded end-portion of bolt 10 between the inner wall of the adjacent fork of trolley-pole-head 5 and member 9, and a washer 14 may be borne by the head-end-portion of said bolt between the inner wall of the fork adjacent thereto and said member, said nut and said washer being adapted for spacing said member from said inner walls of said forks.

Member 9 may be made of any suitable material, such, for instance, as spring metal, and may be curved longitudinally or bow-shaped, substantially as shown in the drawings, with its upper end adapted to engage in the sets of notches 8 to hold disk 1 yieldingly against rotation in one direction, said notches being substantially similar to the notches formed by the teeth of a ratchet-wheel and said member 9 being substantially a spring pawl.

Pin 15 may be made of any suitable material, such, for instance, as metal, and is adapted as a removable key that may be inserted through a perforation 16, there being one or more of said perforations transversely through wheel 1, said perforation or perforations being so located that pin 15 may be inserted therethrough through lateral openings 17 in the forks of trolley-pole-head 5 in the position shown in the full lines in Fig. 1 or adjacent the upper ends of said forks in the position shown by dotted lines in Fig. 1, in either of which positions said pin or key is adapted for locking said disk against further rotation in one direction, or the other, respectively, when said wheel, with pin 15 therethrough, has been rocked on its axis to a position in which said pin is in engagement with adjacent parts of said trolley-pole-head. The ends of pin 15 may be perforated, as shown in the drawings, and cotter pins 18 or the like may be removably inserted through said perforated ends for holding said pin in place in locking position in a perforation 16.

A convenient construction of wheel 1 is depicted in the drawings by way of illustration, showing four sets of notches 8 dividing the circumference of said wheel into substantially four equal parts and showing, also, four perforations 16 spaced apart substantially correspondingly to the divisions formed by said sets of notches.

In operation on a forwardly moving car, the normal position of parts is that in which trolley-pole-head 5 is inclined upwardly toward the rear of the car on the end of a similarly inclined trolley-pole (not shown) with member or spring pawl 9 engaging a set of notches 8, as shown in Figs. 1 and 3, and holding wheel 1 yieldingly against rotation clock-wise so that said wheel will constitute a sliding contact in engagement with the trolley-wire or the like (not shown, said wire being received in groove 3).

Wheel 1 being held yieldingly against rotation, as hereinabove described, by means of member or spring pawl 9, the usual spring of the trolley-pole (not shown) may be set at a very great tension, whereby said wheel is pushed upwardly with ample force against the trolley-wire (not shown) to keep said wheel constantly in contact with said wire so that, under all operating conditions, such, for instance, as in the case of an ice-covered trolley-wire, the wheel will form the desired contact and will function efficiently. Moreover, the yielding tension of member or spring pawl 9 will permit wheel 1 to ride freely over switches, crossings and the like as same are encountered and will facilitate the forming of a substantially continuously completed circuit through said wheel and said trolley-wire.

In backing a car with the parts of this device in the normal position hereinabove described wheel 1 will rotate counter-clockwise freely as axle or shaft 2 rotates in its bearings, spring-pawl 9 sliding along the inclined slope of each set of notches 8 and out of engagement with the shoulder thereof as each set of notches is presented to said pawl as said wheel rotates, thus permitting said wheel to operate substantially in the manner of an ordinary rotary trolley-wheel in contact with the trolley-wire, said rotation of said wheel continuing as long as the car is backing up and, when the car is again run in a forward direction, spring-pawl 9 will again engage in an adjacent set of notches 8 and again hold the wheel against rotation clock-wise.

By inserting removable pin or key 15 through a perforation 16 in the position shown in the full lines or in the dotted lines in Fig. 1, wheel 1 will be locked against rotation counter-clockwise when said car is backed up and, also, should spring-pawl 9 be inoperative or broken, said pin or key so inserted through a perforation 16 will lock said wheel against rotation clock-wise, thus constituting said wheel a non-rotating contact in sliding engagement with the trolley-wire when the car is moved in either direction.

Should a portion of wheel 1 adjacent or between two sets of notches 8 be broken or damaged so that a proper contact with the trolley-wire can not be formed with said damaged or broken part presented to the trolley-wire, pin or key 15 may be inserted in a perforation 16 in an appropriate position with reference to said broken or damaged part of the wheel to lock the wheel in such a position that a serviceable part of the wheel will be presented to said trolley-wire for slidable engagement therewith.

The base or looped end of spring-pawl 9 may be loosely mounted on bolt 10 and a portion adjacent said looped end may bear downwardly against the bottom of the forked end of trolley-pole-head 5, as best seen in Fig. 3, to hold said spring-pawl in position adapted for permitting its upper end to engage the sets of notches 8. By this arrangement of parts, should it be desired to remove an installed spring-pawl for any reason, such, for instance, as for repair, this may be readily done by removing bolt 10 from the trolley-pole-head and removing the spring-pawl, and a new pawl or the repaired pawl may be installed by inserting said bolt in place with said pawl mounted thereon.

By removing a cotter-pin 7, axle 6 with a damaged wheel may be removed and a new or repaired wheel may readily be mounted in operative position by replacing said axle in its bearings with the wheel thereon.

It is, of course, understood that wheel 1 may be rigidly borne by axle 2 and said axle rotatably mounted in its beaarings or said wheel may be mounted rotatably on said axle and said axle rigidly mounted in the trolley-pole-head, moreover, the wheel may be provided with a graphite bearing of well-known construction and adapted for mounting the wheel rotatably on the axle 2 or the like in the manner of an ordinary rotary trolley-wheel, so that when the wheel is operated as a rotary contact for the trolley-wire, the rotation of said wheel will not grind out the axle quickly.

Many changes in the construction and in the arrangement and combination of parts may be made without departing from the nature and spirit of the present invention.

I claim:

1. The combination with a trolley head, of a wheel rotatably mounted in said head, and means coöperating with said wheel for yieldingly holding said wheel against rotation in one direction and allowing free rotation in the other direction.

2. The combination with a trolley head, of a wheel rotatably mounted in said head, and detachable resilient means engaging the peripheral face of said wheel for holding said wheel against rotation in one direction and allowing free rotation in the other direction.

3. The combination with a trolley-head of a wheel rotatably mounted in said head, said wheel having notches in its peripheral face, and means engaging in said notches for yieldingly holding said wheel against rotation in one direction and allowing free rotation in the other direction.

4. The combination with a trolley-head of a wheel rotatably mounted in said head, said wheel having an annular groove and transverse notches in its peripheral face, said groove being adapted for receiving a trolley-wire or the like therein in contact with said wheel, and a resilient pawl adapted for engaging in said notches for yieldingly holding said wheel against rotation in one direction and allowing free rotation in the other direction.

5. The combination with a trolley-head of a wheel rotatably mounted in said head and adapted as a traveling contact for a trolley-wire or the like, said wheel having notches in its peripheral edge, a resilient pawl having one end mounted on said trolley-head and having its other end adapted for engaging in said notches for yieldingly holding said wheel against rotation in one direction.

6. In combination with a trolley head, a wheel rotatably mounted in said head, an annular groove formed in the peripheral face of said wheel, a plurality of ratchet teeth formed on the periphery of the opposite walls of said groove, and means engaging with said ratchet teeth for yieldingly holding said wheel against rotation in one direction.

7. In combination with a trolley head, a wheel rotatably mounted in said head, an annular groove formed in the peripheral face of said wheel, a plurality of ratchet teeth formed on the periphery of the opposite walls of said groove, and a pawl adapted to engage with said ratchet teeth for yieldingly holding said wheel against rotation in one direction.

8. In combination with a trolley head, a wheel rotatably mounted in said head, an annular groove formed in the peripheral face of said wheel, a plurality of ratchet teeth formed on the periphery of the opposite walls of said groove, and a resilient pawl supported on said head, and adapted for engagement with said ratchet teeth for yieldingly holding said wheel against rotation in one direction, and adapted to slide out of engagement with said ratchet teeth when traveling in the opposite direction to constitute said wheel a rotary contact.

In testimony whereof I hereunto affix my signature.

GEO. D. HARLOW.

Copies of this patent may be obtained for five cents each, by addressing the "Commissioner of Patents, Washington, D. C."